United States Patent
Sprunk et al.

(10) Patent No.: US 7,929,701 B1
(45) Date of Patent: Apr. 19, 2011

(54) MULTIPLE LEVEL PUBLIC KEY HIERARCHY FOR PERFORMANCE AND HIGH SECURITY

(75) Inventors: Eric J. Sprunk, Carlsbad, CA (US); Paul Moroney, Olivenhain, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 10/049,812

(22) PCT Filed: Jan. 28, 2000

(86) PCT No.: PCT/US00/02170
§ 371 (c)(1),
(2), (4) Date: Dec. 27, 2001

(87) PCT Pub. No.: WO00/45546
PCT Pub. Date: Aug. 3, 2000

Related U.S. Application Data

(60) Provisional application No. 60/128,772, filed on Apr. 9, 1999, provisional application No. 60/117,788, filed on Jan. 29, 1999.

(51) Int. Cl.
*H04L 9/00* (2006.01)
*H04L 29/06* (2006.01)
(52) U.S. Cl. ........................................ 380/277; 713/166
(58) Field of Classification Search .................. None
See application file for complete search history.

(56) References Cited

U.S. PATENT DOCUMENTS

| 4,578,531 A | 3/1986 | Everhart et al. |
| 4,868,877 A | 9/1989 | Fischer |
| 4,935,962 A | 6/1990 | Austin |
| 5,237,611 A | 8/1993 | Rasmussen et al. |

(Continued)

FOREIGN PATENT DOCUMENTS

EP  0328232 A2  8/1989

(Continued)

OTHER PUBLICATIONS

Schneier, "Applied Cryptography: Protocols, Algorithms, and Source Code in C," Second Edition, 1996, pp. 183-184.*

(Continued)

*Primary Examiner* — Brandon S Hoffman
(74) *Attorney, Agent, or Firm* — Stewart M. Wiener

(57) ABSTRACT

Multiple public/private key pairs of varying levels of security are used to provide a high level of security while still allowing fast processing of encrypted information. The lower-security level includes keys that are small in length, that are changed relatively often, and that require less or fewer resources to implement their functions. When it is required to change key pairs of low security, a key pair at a higher security level (i.e., longer length keys) than the lower-security level keys is used to transfer the new lower-security public keys to devices using those keys. The higher-security keys can, in turn, be changed at a frequency lower than the lower-security keys. The higher-security keys require a higher level of resources to perform their coding operations. This approach of using keys of escalating levels of security to replace lower-security keys, where the higher-security keys require more resources, are more secure, and are replaced less often than the lower-security keys, can be followed as many times as is desired to create a hierarchy of public key uses with the result that the lower-security operations can be performed quickly while the overall system security is high.

17 Claims, 2 Drawing Sheets

U.S. PATENT DOCUMENTS

| | | | |
|---|---|---|---|
| 5,297,206 A | | 3/1994 | Orton |
| 5,371,794 A | | 12/1994 | Diffie et al. |
| 5,410,602 A | | 4/1995 | Finkelstein et al. |
| 5,535,276 A | | 7/1996 | Ganesan |
| 5,539,824 A | | 7/1996 | Bjorklund et al. |
| 5,557,678 A | | 9/1996 | Ganesan |
| 5,600,722 A | | 2/1997 | Yamaguchi et al. |
| 5,664,017 A | | 9/1997 | Gressel et al. |
| 5,680,458 A | | 10/1997 | Spelman et al. |
| 5,761,306 A | * | 6/1998 | Lewis .................. 380/282 |
| 5,781,629 A | | 7/1998 | Haber et al. |
| 5,796,840 A | * | 8/1998 | Davis .................. 705/51 |
| 5,812,671 A | | 9/1998 | Ross, Jr. |
| 5,825,888 A | | 10/1998 | Kimura et al. |
| 5,838,792 A | | 11/1998 | Ganesan |
| 5,850,443 A | * | 12/1998 | Van Oorschot et al. ...... 380/285 |
| 5,864,667 A | | 1/1999 | Barkan |
| 5,917,912 A | | 6/1999 | Ginter et al. |
| 5,974,043 A | | 10/1999 | Solomon |
| 5,999,525 A | | 12/1999 | Krishnaswamy et al. |
| 6,026,491 A | | 2/2000 | Hiles |
| 6,035,402 A | | 3/2000 | Vaeth et al. |
| 6,044,350 A | * | 3/2000 | Weiant et al. ............ 705/1 |
| 6,058,188 A | | 5/2000 | Chandersekaran et al. |
| 6,215,877 B1 | | 4/2001 | Matsumoto |
| 6,233,341 B1 | * | 5/2001 | Riggins .................. 380/277 |
| 6,240,183 B1 | | 5/2001 | Marchant |
| 6,263,437 B1 | | 7/2001 | Liao et al. |
| 6,314,521 B1 | | 11/2001 | Debry |
| 6,438,666 B2 | * | 8/2002 | Cassagnol et al. ............ 711/163 |
| 6,571,221 B1 | | 5/2003 | Stewart et al. |
| 6,757,823 B1 | | 6/2004 | Rao et al. |
| 6,795,555 B1 | | 9/2004 | Parisien et al. |
| 6,889,321 B1 | | 5/2005 | Kung et al. |

FOREIGN PATENT DOCUMENTS

| | | |
|---|---|---|
| EP | 0738058 | 10/1996 |
| WO | 96/39765 | 12/1996 |
| WO | WO 97/31450 A | 8/1997 |
| WO | 9810558 | 3/1998 |
| WO | 9859467 | 12/1998 |
| WO | WO 99/09700 A | 2/1999 |

OTHER PUBLICATIONS

Menezes, van Oorschot, and Vanstone: "Handbook of Applied Cryptography", CRC Press, pp. 551-553.*

Menezes, van Oorschot, and Vanstone: "Handbook of Applied Cryptography", CRC Press, pp. 551-553, 578-581.*

Office Action, Japanese App. No. 2000-596433 (English Translation), May 19, 2010.

Japanese Laid-Open Publication #9-307544 (abstract), Nov. 28, 1997.

Shinji Ishii, et al, "2,048-bit Public Key Encryption Processor", Mar. 10, 1998, vol. 47, Issue #3, pp. 261-268.

"Cisco Announces New Cable Broadband Access Product to Support Integrated Data, Voice, and Video", Internet Citation dated Jan. 8, 1999; Cisco. (XP002147934) http://newsroom.cisco.com/dlls/fspnisapi4a13.html.

"IP Telephony", Internet Citation dated from 1998; Nortel Networks. (XP002147949) URL: http://www.cablenet.org/cn98/apps/nor/t_teleph_col.pdf.

"Security and Encryption for H-series (H.323 and other H245-based) Multimedia Terminals; H.235" ITU-T Standard, International Telecommunication Union, dated Feb. 1, 1998 (XP017401338).

Schneier, Bruce. Applied Cryptography: Protocols, Algorithms, and Source Code in C. Oct. 1995.

Office Action, Japanese Application No. 2000-596433 (English translation), May 19, 2010.

Yu, Takamoto, "Self-Identification by S/MIME Electronic Signature Increasing with an Increase Mailers", Nikkei BP, Sep. 22, 1997, Issue # 169, pp. 206-215.

Warwick Ford, "Digital Signature and Encryption Techniques", 1st Version, Dec. 24, 1997, p. 166 & pp. 175-177.

Eiji Okamoto, "Introduction to Encryption Theory", 1st Version, Feb. 25, 1993, pp. 109-112.

* cited by examiner

MULTIPLE LEVEL PUBLIC KEY HIERARCHY FOR PERFORMANCE AND HIGH SECURITY

CROSS-REFERENCES TO RELATED APPLICATIONS

This application claims priority from U.S. Provisional Patent Application Ser. No. 60/117,788 filed on Jan. 29, 1999 and from U.S. Provisional Patent Application Ser. No. 60/128,772 filed on Apr. 9, 1999, the disclosures of which are incorporated in their entirety herein by reference for all purposes.

BACKGROUND OF THE INVENTION

This invention relates in general to security in digital communication networks and more particularly to the establishment of a multiple level public key hierarchy in a digital communication network that provides a scheme for changing keys with a choice of security and performance parameters.

Public key systems have become a very popular means for providing security in digital systems. Public Key Systems (PKS) have two different keys, one for encryption, or signing, and one for decryption, or verifying. This separation of keys has great security value in that the sign/encrypt function can be securely isolated from verify/decrypt functions, as is appropriate for the typical use of these keys. Public key systems are also known as asymmetric systems, or cryptosystems, as opposed to non-public key systems that are known as symmetric, or secret key, systems.

Security is crucial in the case of authentication, where the presence of a signing key in a verifying entity presents substantial risk to a network. The loss of a signing key means that an unauthorized party can synthesize apparently legitimate messages, thereby fooling the receiver into accepting said messages.

Thus, it is desirable for the isolation characteristics of public key to be made available in operations involving a transmitter (who encrypts and/or signs) and a receiver (who decrypts and/or verifies).

As digital processing, and transfers of digital information, become increasingly popular it is necessary to ensure that the information processed and handled by these systems remains confidential, or secure, as desired. For example, the field of digital telephony needs to protect the voice data that is transferred over a network, such as the internet, if such voice data communications are to be protected. Also, large systems such as a digital telephony network, the internet, a video data network, etc., must have digital "infrastructures" that are not easily broken into by people who may wantonly, or illegally, seek the information, services, or other value from such systems. Such systems need to be highly resistant, or immune, to many forms of theft.

However, a problem exists with today's public key applications because the use of longer, more secure, keys means that more processing resources are required to perform the encoding or decoding functions. Such resources as processing cycles, memory, number of transistors (i.e., chip "real estate") bandwidth and the overall time it takes to perform an encoding or decoding function are vital to efficient and fast coding operations. Unfortunately, when a key is of sufficient length to guarantee an acceptable level of security, it often means that the time required to perform the coding function is prohibitive in a particular application.

For example, in a digital telephony application, many thousands of small packets of voice data must be transferred each second. The speed at which these transfers must take place leaves very little time for coding operations using long keys. Today's typical resources may only allow fast and efficient coding operations with small key sizes where the keys are too easily broken. For this reason, most very high volume and high frequency coding applications have avoided using public keys, or have used public keys sparingly or only in low performance applications.

Public Key Performance

Typically, public key processes are thousands of times slower than the nearest equivalent non-public key (or symmetric key) approach. This is due to two effects:

1. The mathematics behind public key mean that not all numbers of the correct size to be a key are actually valid keys. This has the effect of lengthening the key size far beyond N bits to achieve a security level of $2^N$; e.g. a 1024 bit RSA key has a security level equal to about $2^{90}$, rather than $2^{1024}$. Ergo, to perform key operations at a security level equivalent to 90 bits, much larger and slower 1024 bit keys must be used. In non-public key ciphers, an 90 bit key typically provides a security level of $2^{90}$.

2. The mathematical operations of public key encryption and decryption are not performed with fast and simple boolean operations, as with non-public key ciphers. Algebraic operations such as multiplication and exponentiation are used, which are bit-for-bit much more burdensome than boolean-type operations.

In general, public key operations are more burdensome than non-public key operations, and many more bits of key are needed to achieve the same level of security as non-public key ciphers. Together, these effects mean that public key operations are thousands of times slower than non-public key operations.

Improving Public Key Performance Using Special Keys

Unlike non-public key algorithms where execution time is independent of the specific key value, not all public keys require the same amount of time to encrypt/sign or decrypt/verify. Special keys can be chosen for improved performance, so long as the reduced security that unavoidably comes with these special keys is also acceptable. This can help performance for some encrypt/decrypt or sign/verify operations.

Assuming no special keys are chosen, then a performance burden exists for both encryption/signing operations and for decryption/verification operations. Neither the encrypt/sign operation nor the decrypt/verify operations would be exposed to reduced security, since no special keys are used for either of these. The combined operation of encryption followed by decryption, or signing, followed by verification would be burdensome and the total amount of time required would be long.

In the case where one key is a special higher performance key and the other is not special the operation that uses the special higher performance key must tolerate a vastly reduced level of security. The side that does not use such a special key retains its maximum security level. The total amount of time for the net encrypt/decrypt or sign/verify operation is about half of the worst case. This situation is the typical use of public key algorithms.

The case where both sides use special higher performance keys is invalid. This is because a key cannot be special, higher performance without also having greatly lowered security, and it is degenerate for both sides of an encrypted channel to have virtually zero security.

Other permutations of special higher performance public key use are possible in various combinations of encryption and decryption, and signing and verifying. Table I, below, enumerates these possibilities for completeness, with the following terms used:

"Weak" means a special high performance, low security public key is used, while "Strong" means a non-special, low performance, high security public key is used.

"Auth Used?" means whether authentication is used in addition to encryption, versus encryption alone.

"Sec Level" means a relative weighing of total security in a qualitative and subjective sense, comprising ratings of Lowest, Low, Medium, High, and Highest.

"Perf Level" means the number of burdensome low-performance public key operations performed, comprising Highest=0 burdensome operations, High=1, Medium=2, Low=3, and Lowest=4 operations.

An "Invalid & Degenerate" case is where the specific combination makes no security sense at all, such as where all keys are weak, zero-security keys.

TABLE I

| Case | Auth Used? | Encrypt Key | Decrypt Key | Signing Key | Verifying Level | Sec Level | Perf Level | Notes |
|---|---|---|---|---|---|---|---|---|
| 1 | No | Weak | Weak | N/A | N/A | Lowest | Highest | Invalid & degenerate. |
| 2 | No | Weak | Strong | N/A | N/A | Low | High | Used in DOCSIS. |
| 3 | No | Strong | Weak | N/A | N/A | Low | High | Invalid & degenerate. |
| 4 | No | Strong | Strong | N/A | N/A | Medium | Medium | Atypical; Company private use only. |
| 5 | Yes | Weak | Weak | N/A | N/A | Lowest | Highest | Invalid & degenerate. |
| 6 | Yes | Weak | Strong | Weak | Weak | Low | High | Invalid & degenerate. |
| 7 | Yes | Weak | Strong | Weak | Strong | Medium | Medium | Invalid & degenerate. |
| 8 | Yes | Weak | Strong | Strong | Weak | Medium | Medium | Typical standard use, e.g. Internet |
| 9 | Yes | Weak | Strong | Strong | Strong | High | Low | Atypical; Company private use only. |
| 10 | Yes | Strong | Weak | N/A | N/A | Low | High | Invalid & degenerate. |
| 11 | Yes | Strong | Strong | Weak | Weak | Medium | Medium | Invalid & degenerate. |
| 12 | Yes | Strong | Strong | Weak | Strong | High | Low | Atypical; Company private use only. |
| 13 | Yes | Strong | Strong | Strong | Weak | High | Low | Atypical; Company private use only. |
| 14 | Yes | Strong | Strong | Strong | Strong | Highest | Lowest | Atypical; Company private use only. |

Table I illustrates the basic problem with the use of special public keys, namely that there is no valid case where good security and good performance (i.e., low resource requirements) are both obtained.

SUMMARY OF THE INVENTION

The present invention uses multiple public/private key pairs of varying levels of security. The lower-security level includes keys which are small in length, which are changed relatively often, and which require low resources to implement their coding functions. When it is desired to change key pairs of low security, a key pair at a higher security level (i.e., longer length keys) than the lower-security level keys is used to transfer the new lower-security public keys to devices using the higher-security keys. The higher-security keys can, in turn, be changed at a frequency lower than the lower-security keys. The higher-security keys require a higher level of resources to perform their coding operations. This approach of using keys of escalating levels of security to replace lower-security keys, where the higher-security keys require more resources, are more secure, and are replaced less often than the lower-security keys, can be followed as many times as is desired to create a hierarchy of public key uses with the result that the lower-security operations can be performed quickly while the overall system security is high.

This allows public key encryption to be used in applications where the traditional key size would give unacceptably low performance; and provides a multi-level hierarchy, but avoids the performance problem by having keys lower in the hierarchy be of small size and thus higher performance. A variety of extensions and variations are possible, with different security and performance characteristics.

In one embodiment, the invention provides a public key hierarchy in a digital telephony system. A three-tiered approach is used. The lowest security level keys are the "call" keys and are the smallest having a length of 512 bits. These keys are changed every few seconds. The next higher security keys are the "group" keys which have a length of 1024 bits.

These keys are changed about once a month. The highest security keys are the "unit" keys. The unit keys are 2048 bits in length and are hard-coded into their respective devices at the time of manufacture. The unit keys are not designed to be changed over the life of the unit.

In another embodiment the invention provides a method for updating keys in a digital system used to transfer data over a network, wherein a plurality of devices are used to decode data, wherein each device uses a first type of key to decode the data, a second type of key to decode substitute first keys, and a third type of key to decode substitute second keys, wherein the devices decode data at a first rate of decode occurrences, wherein each decode occurrence requires a first amount of time. The method comprising transferring encoded substitute first keys to the devices, wherein the transfers of the encoded substitute first keys occur at a second rate that is less than the first rate of decode occurrences, wherein the decoding of the substitute first keys requires a second amount of time that is greater than the first amount of time; and transferring encoded substitute second keys to the devices, wherein the transfers of the encoded substitute second keys occur at a third rate that is less than the second rate of decode occurrences, wherein the decoding of the substitute second keys requires a third amount of time that is greater than the second amount of time.

DESCRIPTION OF THE SPECIFIC EMBODIMENTS

For a general discussion of cryptography see, e.g., Schneier, Bruce A., "Applied Cryptography" (2d Edition), 1996.

Key Hierarchies

The present invention uses a key hierarchy. This is a scheme where interrelated keys of varying levels of security work together in a system. A preferred embodiment of the invention is in a telephony system that employs a digital network for transmission. However, many other applications of the invention are possible. For example, the system can be employed where standard data transfers for numbers, text, email, image, audio or other information take place by sending small amounts of data at very frequent intervals. Normally, this would make it impractical to use a public key approach where the keys are of sufficient length to give a moderate degree of security.

Note that the examples discussed in this specification do not show the use of authentication but, instead, only deal with the use of public keys for encrypted delivery of keys. It should be apparent that authentication can be handled in a similar manner.

The invention is applicable to any system where a public key is used to deliver another public key, even if either of the public keys are also used to deliver a non-public/secret key in a symmetric system.

Figure 1:
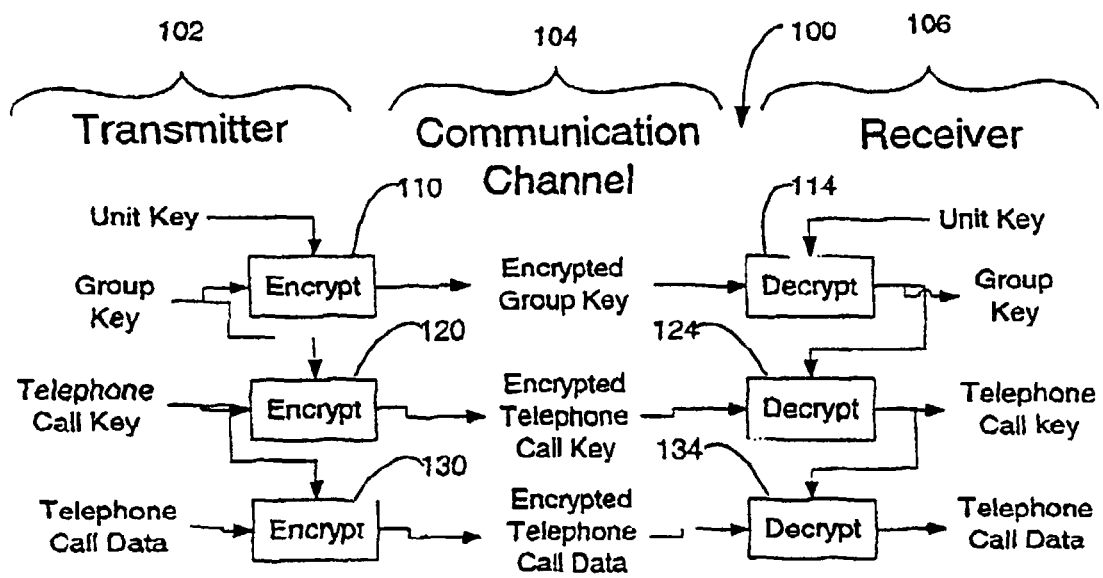
FIG. 1 shows an embodiment of the invention in a telephony system.

FIG. 1 shows an embodiment of the invention in a telephony system.

FIG. 1 shows a simple non-public key hierarchy. In FIG. 1, telephony system includes transmitter 102, communication channels 104 and receiver 106. The transmitter sends information to the receiver. There are three tiers of operation to which three separate key pairs are, respectively, assigned. A receiver, such as receiver 106 has a "unit key" specific and distinct to that receiver. The unit key is used to deliver messages that are only for the specific receiver. A group of receivers, such as those corresponding to users who have paid their telephone bill for a given month, together hold a shared "group key" conveying membership in that group. A stream of encrypted data (i.e. a telephone call) is encrypted under a "Telephone Call Key", which must be possessed by the receiver that needs to be able to decrypt that call.

A simple hierarchy for a non-public key, secret key or symmetric key system based on the keys above is where the Unit Key is used to deliver the Group Key, and the Group Key is used to deliver the Telephone Call Key. Thus, a unit key is used to encrypt a new group key by transmitter 102 in operation 110. The group key can only be decrypted by a single receiver, 106. However, multiple transmitters (not shown) would each encrypt the same group key in like operations 110 and transmit to their respective receivers (also not shown). In this way, multiple receivers can receive a common, and updated, group key from an operation 110.

Note that, although a one-to-one relationship is shown among the transmitters and receivers with respect to the unit keys, the actual implementation can be a point-to-point routing-based network such as the Internet. Thus, a list of unit keys for encoding, called a "keylist," is typically stored at a single transmitter to enable the transmitter to send new group keys to multiple receivers.

The key hierarchy in this example is the linkage between Unit Key, Group Key, and Telephone Call Key. The Unit Key is at the top of the hierarchy, and the Telephone Call Key at the bottom. The purpose of this hierarchy is to protect the Telephone Call Data.

The Unit Key used for decoding is not delivered through the communication channel, and is presumed to already be present in the receiver, such as after installation at manufacture time.

All Group Key delivery messages sent over the communication channel are encrypted using the Unit Key. Group Key messages are typically sent at least once each month.

All Telephone Call Key delivery messages sent over the channel are encrypted using the Group key. Telephone Call Key messages would typically be sent within a very short period of time after the call begins (e.g. within a second), to allow rapid access to a Telephone Call soon after a receiver initiates or responds to it. Telephone Call Key messages would change (along with the Telephone Call Key itself), each time a new Telephone Call occurred.

All Telephone Call data sent over the channel is encrypted using the Telephone Call Key in operation 130. For a Transmitter to encrypt the Telephone Call in operation 130, it must create encrypted messages using the keys of the key hierarchy. The Telephone Call Key is used to encrypt the Telephone Call data in operation 130, and is itself encrypted by the Group Key in operation 120. The Group Key is encrypted for delivery using the Unit Key in operation 110. The Unit Key is looked up on a list. Thereafter, the encrypted Telephone Call data, encrypted Telephone Call Key, and encrypted Group Key are sent into the communication channel 104.

For a receiver to decrypt the Telephone Call, it must process encrypted messages in a sequence that traverses the key hierarchy from top to bottom. The Unit Key is used to decrypt the delivered Group Key in operation 114, which is then used to decrypt the delivered Telephone Call Key in operation 124, which is then used to decrypt the received Telephone Call data in operation 134.

Figure 2:
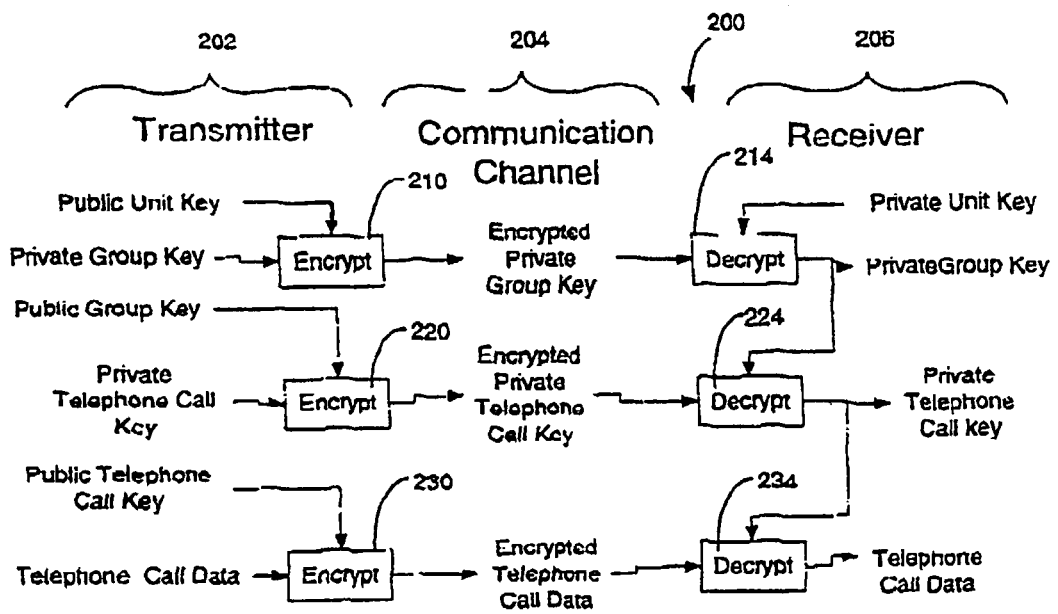
FIG. 2 shows a multiple level Public Key hierarchy version of FIG. 1.

FIG. 2 shows a multiple level Public Key hierarchy version of FIG. 1. Note the differences that occur due to FIG. 1 describing a single key system, where the same key is used for both encryption and decryption, versus FIG. 2 which depicts a public key system with public and private key pairs. Since FIG. 2 shows a public key system, the key to encrypt at the Transmitter 202 is not the same as the key to decrypt at the Receiver 206. As is typical with public key systems, encryption is performed with a public key, while decryption is performed with the corresponding private key. When a Transmitter 202 is encrypting a key for decryption use in the Receiver 206, the key must be a private key since only private keys can be used for the decryption operations 214, 224, and 234.

As in FIG. 1, all Telephone Call Data is encrypted using the Telephone Call Key in operation 230, except now operation 230 uses a different key than the decryption operation 234. Operation 230 uses the public Telephone Call Key, and operation 234 uses the private Telephone Call Key. Together, these two keys are a public key pair. For a transmitter to encrypt the Telephone Call in operation 230, it must create encrypted messages using the keys of this key hierarchy. The public Telephone Call Key is used to encrypt the Telephone Call Data in operation 230, but is never itself encrypted and delivered to the receiver since the receive does not require the public key to decrypt. Instead, the private Telephone Call Key is encrypted in operation 220 using the Public Group Key, and sent to the Receiver 206 for decryption using the private Group Key in operation 224. Similarly, the Private Group Key is encrypted in operation 210 using the public Unit Key, and is sent to the Receiver 206 for decryption in operation 214 using the private Unit Key.

When applying public key technology to a key hierarchy such as in the system of FIG. 2, the performance problem is immediately encountered. The severity of this problem varies depending where it is used in the hierarchy:

In the preferred embodiment, shown in FIG. 2, Unit Keys are used to decrypt Private Group Keys, which change approximately each month. A slow decryption speed for Private Group Keys due to the slowness of public key algorithms is acceptable in this case, due to this infrequent use.

Private Group Keys are used to decrypt Private Telephone Call Keys, which must be delivered within about one second. A receiver that initiates or responds to a specific Telephone Call would therefore need to very quickly perform a public key algorithm-based Private Group Key decryption of a Private Telephone Call Key, which creates a performance challenge. This time period must be kept as short as possible to minimize consumer complaints, yet this is difficult when using slow public key algorithms.

Private Telephone Call keys are used to decrypt Telephone Call data, which is delivered fairly rapidly and which would require several dozen or hundred public key decryption per second to process in real time. This is a very severe performance challenge to a public key algorithm.

In the present invention, keys at different levels of the hierarchy are changed at different rates. The Telephone Call Key public key pair changes with each new call. This means that the Telephone Call Key encryption and decryption, or "coding," functions need to have very fast performance (i.e., low resource needs). Fast performance is obtained by using keys of relatively short length.

Figure 3A:
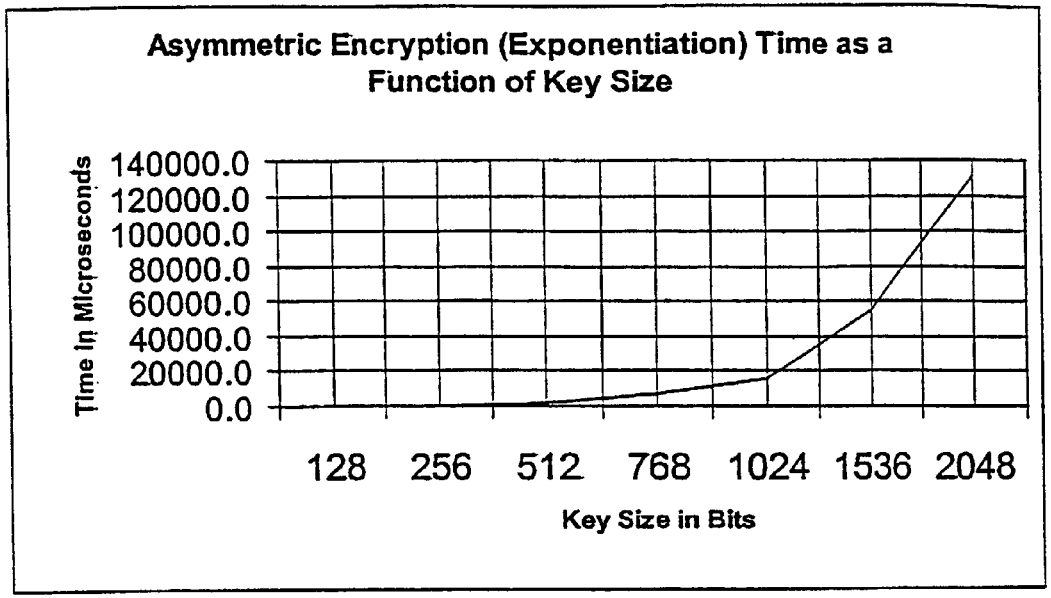
FIG. 3A charts encryption time as a function of key size.

In public key systems, encryption/decryption/signing/verifying performance is a cubic function of key size. Using a key that is half the size that would otherwise be used reduces the performance burden to ⅛ its former value, which is a reduction of 87.5%. Using a key that is one-fourth the size is a 98.4% reduction, while a key ⅛ the size is a 99.8% reduction. This is shown in FIG. 3A. The performance problem can therefore be solved if smaller keys are used.

Figure 3B:
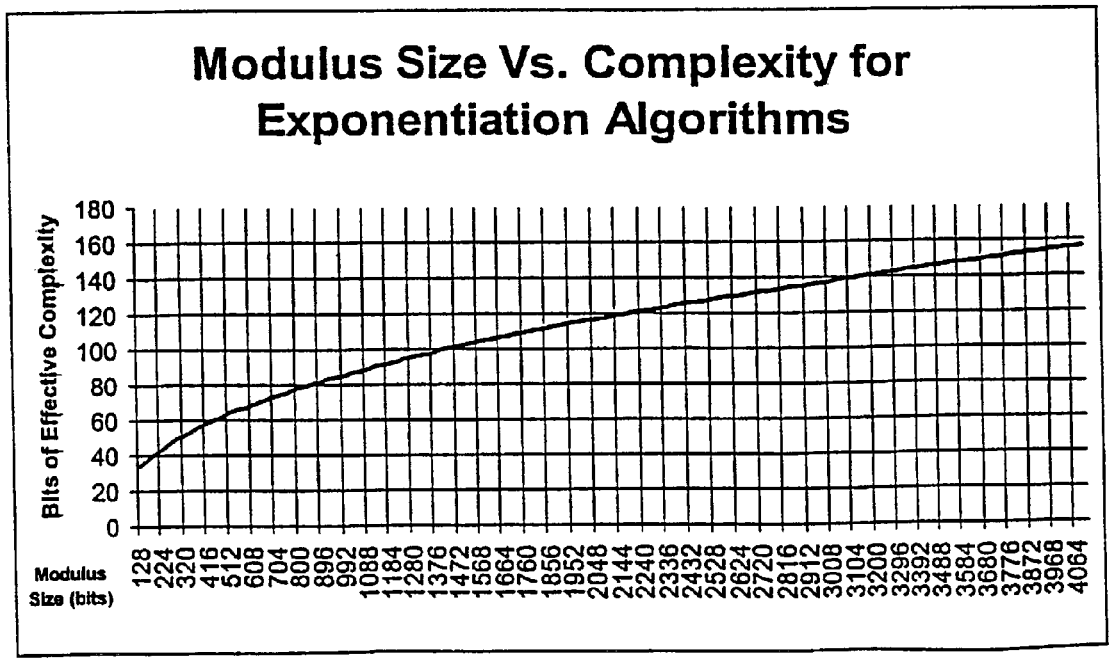
FIG. 3B chargs mudulus size vs. complexity for exponentiation algorithms.

But smaller keys have less security. To compensate for this reduced security, the smaller keys must have a shorter lifetime to reduce system risk accordingly. There is a direct tradeoff between the lifetime of a key and its security level. Security level as a function of key size is shown in FIG. 3B for a class of Public Key algorithms known as "exponentiation ciphers."

A basic concept of the invention is to build a public key hierarchy where the keys that would present an unacceptable performance burden are shortened to relieve that burden, but are then regularly and frequently replaced to compensate for the security lost due to their having been shortened.

In a preferred embodiment the following specific key sizes are used:

1. Let the Unit Key be a 2048 bit RSA key pair, which gives excellent long term security. This key is never changed for the life of the receiver. In one implementation, the time required to decrypt a Private Group Key using this key is about 1 second.

2. Let the Group Key pair be a 1024 bit RSA key, which is delivered using the 2048 bit Unit Key no less often than monthly, or perhaps even weekly. Using this key to decrypt a private Telephone Call key will take ⅛ the time needed for the longer Unit Key, or 125 milliseconds.

3. Let the Telephone Call Key pair be a 512 bit RSA key, which is delivered using the 1024 bit Group Key. Using the Private Telephone Call Key to decrypt Telephone Call Data will take 1/64 second, or 15.6 milliseconds, for each 512 bits of data.

The 512 bit RSA decryption of Telephone Call Data yields 512 bits of decrypted data each 15.6 milliseconds, which is a total of 32,768 bits per second. Since voice traffic is usually at this rate or much lower (if compressed), this speed is adequate to handle a telephone call. In most applications public key technology is not even considered for multiple-kilobit applications, due to the performance problem. But with this invention, it is quite feasible. If the data rate were faster than this, such as would be necessary with video data, then public key may not be used to protect Telephone Call Data. In that case, a high performance non-public key cipher such as the Data Encryption Standard would be used, where said key would be delivered by a public key (e.g. the 1024 bit Group key) or public key hierarchy.

Note that a public key hierarchy is fundamentally a key delivery mechanism, but that the keys delivered can comprise other public keys (either encrypt, decrypt, sign, or verify keys) or non-public keys (e.g. DES or Triple DES keys or HMAC keys) or both. A natural example would be where one level of a hierarchy (e.g. a 2048 bit Unit Key) delivers two keys. One (e.g. a 1024 bit Private Group Key) could be used as the next lower level key for delivering information or keys in the key hierarchy (e.g. delivering a 512 bit Private Telephone Call Key). The other (e.g. a 1024 bit Signing Group Key) could be used to authenticate (i.e. sign) messages or data sent from that receiver.

In general, the invention provides a multiple-level public key hierarchy, where lower levels use smaller keys than higher levels, and where lower level keys are changed more often than higher levels to compensate for their lower security. Numerous embodiments of this idea are possible, ranging from the delivery of both encrypt keys, decrypt keys, signing keys, verifying keys, and/or non-public keys.

Although the invention has been described with reference to specific embodiments thereof, these embodiments are merely illustrative, and not restrictive, of the invention, the scope of which is determined solely by the appended claims.

What is claimed is:

1. An asymmetric cryptographic processing system using a multiple key hierarchy, the asymmetric cryptographic processing system comprising:
    a digital processing device;
    a first key for performing asymmetric operations at a first rate in the digital processing device, wherein each operation requires a first cryptographic processing time; and
    a second key for performing an asymmetric cryptographic processing operation in the digital processing device to update the first key, wherein the second key is used in cryptographic processing operations for the first key at a second rate that is less often than the first rate and that requires a second cryptographic processing time greater than the first cryptographic processing time.

2. The asymmetric cryptographic processing system of claim 1, wherein the system is used to cryptographically process and transfer digital voice data in a network.

3. The asymmetric cryptographic processing system of claim 1, wherein the system is used to cryptographically process and transfer digital audio data in a network.

4. The asymmetric cryptographic processing system of claim 1, wherein the system is used to cryptographically process and transfer digital video data in a network.

5. The asymmetric cryptographic processing system of claim 1, wherein the system is used to cryptographically process and transfer digital data in a network.

6. The asymmetric cryptographic processing system of claim 1, wherein the second key is hard coded into the system at the time of manufacturing the system.

7. The asymmetric cryptographic processing system of claim 6, wherein a plurality of digital cryptographic processing systems are coupled by a telecommunications system, wherein the second key is distributed to two or more of the asymmetric cryptographic processing systems via the telecommunications system.

8. A method for providing secure data transactions in a telecommunications system, wherein digital processing device receives information from the telecommunications system, wherein the digital processing device uses a first asymmetrical cryptographically processed key to perform an asymmetric cryptographic processing operation to decode the information, wherein the cryptographic processing operation is at a first level of complexity requiring a first amount of resources by the processing device, wherein the cryptographic processing operation is performed at a first rate of cryptographic processing operations per unit time, the method comprising:
    transferring a second asymmetrical cryptographically processed key to the digital processing device, wherein the second asymmetrical cryptographically processed key is used in an asymmetric cryptographic processing operation at a second level of complexity requiring a second amount of resources by the processing device that is higher than the first amount of resources;
    updating the first asymmetrical cryptographically processed key from time-to-time, wherein the updating of the first asymmetrical cryptographically processed key occurs at a second rate of cryptographic processing operations per unit time that is less than the first rate of cryptographic processing operations per unit time, wherein the updating includes the following substeps;
    encoding a substitute first asymmetrical cryptographically processed key with a second key, so that the resulting cryptographically processed substitute first asymmetrical cryptographically processed key is decodable by the second asymmetrical cryptographically processed key; and
    transferring the substitute first asymmetrical cryptographically processed key to the digital processing device so that the substitute first asymmetrical cryptographically processed key is used in subsequent cryptographic processing operations by the digital processing device.

9. The method of claim 8, further comprising:
    transferring a third asymmetrical cryptographically processed key to the digital processing device, wherein the third asymmetrical cryptographically processed key is used in an asymmetric cryptographic processing operation at a third level of complexity requiring a third amount of resources by the processing device that is higher than the second amount of resources;
    updating the second asymmetrical cryptographically processed key from time-to-time, wherein the updating of the second asymmetrical cryptographically processed key occurs at a third rate of cryptographic processing operations per unit time that is less than the second rate of cryptographic processing operations per unit time, wherein the updating includes the following substeps;
    encoding a substitute second asymmetrical cryptographically processed key with a third asymmetrical cryptographically processed key, so that the resulting cryptographically processed substitute second asymmetrical cryptographically processed key is capable of being cryptographically processed by the third asymmetrical cryptographically processed key; and
    transferring the substitute second asymmetrical cryptographically processed key to the digital processing device so that the substitute second asymmetrical cryptographically processed key is used in subsequent cryptographic processing operations by the digital processing device.

10. The method of claim 8, wherein the resources include processing time.

11. The method of claim 8, wherein the resources include transistor density on an integrated circuit.

12. The method of claim 8, wherein the resources include memory capacity.

13. The method of claim 8, wherein the resources include data bandwidth.

14. A method of updating a cryptographic key used for decrypting distributed data, the method comprising:
    in a digital processing device:
    generating a first key for decrypting the distributed data at a first rate, the first key of a first length, wherein each decrypting operation requires a first cryptographic processing time;
    encrypting the first key with a second key, the second key of a second length, wherein the second length is longer than the first length, further wherein the first key encryption processing operations is at a second rate that is less often than the first rate and that requires a second cryptographic processing time greater than the first cryptographic processing time; and
    distributing the encrypted first key, wherein the distributed first key updates the cryptographic key, and
    wherein the cryptographic key, first key, and second key encrypt and decrypt data using a similar class of algorithm to encrypt and decrypt data.

15. The method of claim 14, further comprising distributing data encrypted with the first key.

16. The method of claim 15, further comprising:
generating a third key to replace the first key, the third key of a third length, wherein the third length is shorter than the second length;
encrypting the third key with the second key; and
distributing the encrypted third key.

17. The method of claim 16, further comprising distributing data encrypted with the third key.

* * * * *